United States Patent
Dabrowski et al.

(10) Patent No.: US 9,983,035 B2
(45) Date of Patent: May 29, 2018

(54) METHOD FOR SETTING A CONSTANT MAGNETIC FIELD STRENGTH OF A MAGNETIC FIELD AND A FLOWMETER

(71) Applicant: KROHNE Messtechnik GmbH, Duisburg (DE)

(72) Inventors: Markus Dabrowski, Duisburg (DE); Wilhelm Florin, Duisburg (DE)

(73) Assignee: KROHNE Messtechnik GmbH, Duisburg (DE)

( * ) Notice: Subject to any disclaimer, the term of this patent is extended or adjusted under 35 U.S.C. 154(b) by 67 days.

(21) Appl. No.: 15/282,241

(22) Filed: Sep. 30, 2016

(65) Prior Publication Data

US 2017/0097251 A1    Apr. 6, 2017

(30) Foreign Application Priority Data

Oct. 2, 2015    (DE) .......................... 10 2015 116 771

(51) Int. Cl.
*G01F 1/58* (2006.01)
*G01F 1/00* (2006.01)
*G01F 1/60* (2006.01)

(52) U.S. Cl.
CPC .............. *G01F 1/582* (2013.01); *G01F 1/586* (2013.01); *G01F 1/60* (2013.01)

(58) Field of Classification Search
CPC ................. G01F 1/58; G01F 1/00; G01F 7/00
See application file for complete search history.

(56) References Cited

U.S. PATENT DOCUMENTS

| | | | |
|---|---|---|---|
| 4,726,236 A * | 2/1988 | Wada ........................ | G01F 1/60 73/861.12 |
| 5,544,532 A * | 8/1996 | Brown ...................... | G01F 1/58 73/861.12 |
| 6,634,238 B2 | 10/2003 | Budmiger | |
| 9,021,890 B2 * | 5/2015 | Rogers .................... | G01F 1/584 73/861.12 |
| 9,651,411 B2 * | 5/2017 | Yamaguchi ............. | G01F 1/588 |
| 2015/0177035 A1* | 6/2015 | Rovner ................... | G01F 1/584 73/861.12 |
| 2015/0188416 A1 | 7/2015 | Rufenacht et al. | |

* cited by examiner

*Primary Examiner* — Jewel V Dowtin
(74) *Attorney, Agent, or Firm* — David S. Safran

(57) ABSTRACT

A method for setting a constant magnetic field strength of a magnetic field within a commutation interval using a magnetic-inductive flowmeter having a current controller with which time for setting the constant magnetic field strength of a magnetic field is relatively shorter. Additionally, a first interval having a starting point in time and an ending point in time and a second interval having a starting point in time and an ending point in time are arranged within a commutation interval. A first setpoint current curve for the first interval differs by a difference current curve to effectuate a higher rate of change. A second setpoint current curve is assigned to the constant setpoint current. The current controller is fed the first and second setpoint current curves.

15 Claims, 2 Drawing Sheets

METHOD FOR SETTING A CONSTANT MAGNETIC FIELD STRENGTH OF A MAGNETIC FIELD AND A FLOWMETER

FIELD OF THE INVENTION

The invention relates to magnetic fields and, more particularly, to setting a constant magnetic field strength using a magnetic-inductive flowmeter.

Description of Related Art

The flow of a medium through a measuring tube can be determined from the induction voltage induced in the medium by the magnetic field, where the induction voltage is proportional both to a velocity of the flow of the medium in the measuring tube and to a magnetic field strength in the medium. Further, the magnetic field strength in the medium has to be constant during a measurement of the induction voltage.

The induction voltage is considered constant when the impairment of the measuring accuracy of the flow caused by fluctuations in the induction voltage is considered tolerable. The duration from the beginning of the commutation interval until a constant magnetic field strength is achieved is called the settling time. If the magnetic field strength is not constant during a measurement of the induction voltage, the determined flow is erroneous. Accordingly, a measurement of the induction voltage cannot be carried out until the current controller has been fed the constant setpoint current and the electromagnet has settled to the constant magnetic field strength. The commutation interval has to be at least as long as the settling time.

Magnetic-inductive flowmeters of this type are known from the prior art, in which the constant magnetic field strength is set in that the current controller is fed a constant setpoint current in the commutation interval.

The measuring accuracy of the flow can be increased by decreasing the commutation interval. In particular, decreasing the commutation interval can increase the measuring accuracy of media flowing through the measuring tube, whose flow is subject to short-term fluctuations in relation to the commutation interval. However, decreasing the commutation interval conflicts with the settling time that the electromagnet requires for settling in order to generate a constant magnetic field strength.

SUMMARY OF THE INVENTION

A method for setting a constant magnetic field strength of a magnetic field within a commutation interval uses a magnetic-inductive flowmeter having a measuring tube and an electromagnet for generating the magnetic field. The electromagnet has a current controller and a coil arrangement, with the current controller generating a coil current and the generated coil current effectuating the magnetic field in the coil arrangement. Further, this coil current is commutated at the commutation interval and, when a constant setpoint current of the current controller is preset, the electromagnet generates the constant magnetic field strength in steady state.

The invention also relates to a magnetic-inductive flowmeter having a measuring tube, an electromagnet for generating a magnetic field and a control unit. The electromagnet thereby has a current controller and a coil arrangement, the current controller generating a coil current and the generated coil current effectuating the magnetic field in the coil arrangement. The electromagnet commutates the coil current at the commutation interval, and, when a constant setpoint current of the current controller is preset, the electromagnet generates the constant magnetic field strength in a steady state.

Thus, an object of the invention is to provide a method for setting the constant magnetic field strength of the magnetic field using a magnetic-inductive flowmeter and to provide a magnetic-inductive flowmeter, in which the settling time is shorter than in the prior art.

A magnetic-inductive flowmeter can measure the flow of a medium flowing through a measuring tube. For this purpose, the electromagnet is designed such that the magnetic field the electromagnet generates at least partially interfuses the medium located in the measuring tube, with a flow of the medium in the measuring tube induces an induction voltage in the medium. The induction voltage is proportional to the velocity of the flow of the medium in the measuring tube and, applying the velocity of flow, the volume flow of the medium through the measuring tube is determined, for example, using an inner cross section of the measuring tube, or the mass flow of the medium through the measuring tube is determined additionally using the density of the medium. The flow of the medium through the measuring tube, thus, relates to both the mass flow as well as the volume flow of the medium through the measuring tube.

The induction voltage is tapped with at least one measuring electrode, wherein the at least one measuring electrode is either galvanically in contact or capacitively in contact to the medium in the measuring tube. If the induction voltage is tapped with only one measuring electrode, then the measurement is carried out in respect to a reference potential, which is, for example, the mass potential. If the induction voltage is measured with at least two measuring electrodes, the at least two measuring electrodes are normally in galvanic or capacitive contact to the medium in the measuring tube.

The current controller has a sole controlled current source, which generates the coil current, and a control loop. The function of the control loop is described using a setpoint variable, a process variable and a control variable. The control variable controls the controlled current source, the process variable is the coil current generated from the controlled current source based on the control variable and the setpoint variable is the setpoint current preset in the current controller. The current controller evaluates a difference between the setpoint current and the generated coil current as a control deviation and minimizes the control deviation. In order to minimize the control deviation, for example, the control loop exhibits proportional or integral or derivative control modes, or also any combination of the mentioned control modes. A control loop, for example, exhibiting proportional and integral control modes is called a PI control loop and a control loop exhibiting proportional, integral and derivative modes is called a PID control loop.

Commutation of the coil current at the commutation interval defined by a starting point in time and an ending point in time effectuates a reversal of the direction of the coil current through the coil arrangement at the commutation interval. Consequently, the direction of the magnetic field is also reversed at the commutation interval. Such a magnetic field is called a switched constant magnetic field. The switched constant magnetic field causes a reversal of the direction of the induction voltage at the commutation interval. This causes interfering voltages to be eliminated, in particular interfering direct voltages and interfering alternating voltages generated in supplying the magnetic-inductive flowmeter with an alternating current source.

The coil arrangement usually has a yoke consisting of a material with a lower magnetic resistance than the surroundings for guiding the magnetic field within the yoke and a coil for generating the magnetic field.

According to an aspect of the disclosure, the invention refers to a method for setting the constant magnetic field strength of the magnetic field in which the derived and described object is achieved. The method according to the invention is initially and essentially characterized by the following method steps:

In a first method step, a first interval with a starting point in time and an ending point in time and a second interval with a starting point in time and an ending point in time are arranged within the commutation interval. The first interval is thereby defined by the starting point in time and the ending point in time of the first interval and the second interval is defined by the starting point in time and the ending point in time of the second interval.

The first interval and the second interval can be variously arranged within the commutation interval. However, in every arrangement, the first interval is arranged, in time, before the second interval and the first and second interval do not overlap. In a first arrangement of the first interval and the second interval within the commutation interval, the starting point in time of the first interval coincides with the starting point in time of the commutation interval. In a second arrangement, the ending point in time of the second interval coincides with the ending point in time of the commutation interval. In a third arrangement, the ending point in time of the first interval coincides with the starting point in time of the second interval. A fourth arrangement is an arbitrary combination of the above-mentioned arrangements.

In a second method step, a first setpoint current curve is defined for the first interval. The first setpoint current curve thereby differs by a difference current curve from the constant setpoint current such that the difference current curve, with reference to the constant setpoint current, effectuates a higher rate of change of the magnetic field strength towards the constant magnetic field strength. The rate of change of the magnetic field strength towards the constant magnetic field strength is higher due to a difference in the current curve with reference to the constant setpoint current. Specifically, it is higher when the rate of change of the coil current generated by the current controller is higher than a rate of change of the coil current generated by the current controller when the current controller is fed the constant setpoint current. The higher rate of change of the coil current generated by the current controller is achieved in that the difference current curve causes a greater control deviation in the control loop of the current controller and the current controller, where on the basis of its behavior, effectuates a higher rate of change of the generated coil current.

In a third method step, a second setpoint current curve is defined for the second interval, in that a constant setpoint current is assigned to the second setpoint current curve.

In a fourth method step, the current controller is fed the first setpoint current curve in the first interval and the second setpoint current curve in the second interval. The electromagnet settles in the course of the second interval, so that the electromagnet generates the constant magnetic field strength. Consequently, the induction voltage, from which the flow of the medium is determined, is measured within the second interval when the magnetic field strength is constant.

The method according to the invention has the advantage over the method known from the prior art in that the settling time for setting the constant magnetic field strength of the magnetic field is shorter. This makes it possible to decrease the commutation interval, which improves the measuring accuracy, especially of media flowing through the measuring tube, whose flow is subject to short-term fluctuations.

A controller like the current controller tracks the setpoint variable by minimizing a control deviation. The tracking of the setpoint variable can be thereby be carried out at most with a maximum rate of change of the process variable intrinsic for the controller. The maximum rate of change of the process variable is intrinsic for the controller based on its design and in particular its control mode. The maximum rate of change is called a "slew rate." When the setpoint variable is greater than the setpoint variable that is needed for achieving the slew rate of the process variable, the controller is overdriven. In order to further decrease the settling time, it is thus provided in a first implementation of the method according to the invention that the first setpoint current curve is defined such that the current controller is overdriven by the first setpoint current curve at a beginning of the first interval.

In a further implementation of the method according an aspect of the disclosure, it is provided that the first interval is defined in that it is shorter than a settling time constant of the magnetic field. The settling time constant of the magnetic field can describe the temporal change of the magnetic field strength as a reaction to a step-like change of the coil current. Therefore, the settling time constant accordingly describes the step response of the coil arrangement.

In principle, the first setpoint current curve can have an arbitrary curve over time for the first interval, i.e., be a function of time. In a particularly simple implementation of the method, however, it is provided that the first setpoint current curve is defined such that it is constant. The settling time is also shortened with the first setpoint current curve being constant over time.

In a further implementation of the method that is relatively easy to put into practice, the arrangement of the first interval and the second interval within the commutation interval provides that the starting point in time of the first interval is the starting point in time of the commutation interval. Further, that the ending point in time of the first interval is the starting point in time of the second interval and that the ending point in time of the second interval is the ending point in time of the commutation interval.

In a further implementation of the method that is relatively easy to put into practice, the arrangement of the first interval and the second interval provides that the coil current is measured and then that a point in time is determined, in which the measured coil current has reached the first setpoint current curve or the second setpoint current curve and that the determined point in time is adopted as the ending point in time of the first interval and the starting point in time of the second interval. In a particularly preferred further development of the implementation, this implementation is combined with the above-mentioned implementation. By combining the implementations, the first interval and the second interval are defined in a relatively simple manner.

In a further implementation of the method, it is provided that the first setpoint current curve is defined such that a magnitude of the difference of the current curve does not exceed 15% of the magnitude of the constant setpoint current. This implementation is particularly advantageous in combination with a constant first setpoint current curve, since implementing the method normally does not require changes in the current controller, and causes a considerable reduction in the settling time.

Defining the first interval and/or the first setpoint current curve can be carried out according to different implementations based on one another of the method according to the invention.

In a first of the implementations based on one another, it is provided that the magnetic field strength, or an induction voltage induced in the medium by the magnetic field by flow of the medium in the measuring tube, or the coil current, or a coil voltage generated by the coil current in the coil arrangement, is measured as an indicator quantity. Further, that the first interval and/or the first setpoint current curve is/are defined using the indicator quantity.

In a second implementation, which is based on the first implementation, it is provided that the indicator quantity is measured in a third interval within the second interval. This implementation is based on the finding that the electromagnet has settled and generates the constant magnetic field strength current, when the measured indicator quantity is also constant. The measurement of the induction voltage, from which the flow is then determined, is preferably also carried out within the third interval.

In a third implementation, which is based upon the first or the second implementation, it is provided that an evaluation quantity is formed in that at least a first measured value and a second measured value of the indicator quantity are measured, a mean value is formed and the mean value is subtracted from the first measured value, and that the first interval and/or the first setpoint current curve is/are determined using the evaluation quantity. The mean value is thereby an arithmetic mean value of the at least first measured value and the second measured value. The quality of the indicator quantity increases with the number of measured values, wherein about one thousand measured values is a good compromise between effort for mean value formation and quality of the indicator quantity.

In a fourth implementation, which is based on the third implementation, it is provided that a trend quantity is formed in that an evaluation quantity is determined in the second interval of the commutation interval and in the second interval of at least one further commutation interval and the change of the evaluation quantity is determined. Further, the first interval and/or the first setpoint current curve is/are defined using the trend quantity. The trend quantity can be further developed in that a moving average is formed and it is used for determining the first interval and/or the first setpoint current curve.

It has been recognized that a consideration of a temperature of the magnetic-inductive flowmeter improves the measuring accuracy of the magnetic-inductive flowmeter in determining the first interval and/or the first setpoint current curve. That is why it is provided, in a further implementation of the method, that a temperature is measured at the magnetic-inductive flowmeter and that the measured temperature is used in defining the first interval and/or the first setpoint current curve. In a further development of the implementation, it is provided that the temperature of the coil arrangement and/or the medium and/or a process temperature is also measured. In particular, the temperature of the coil arrangement is of importance, since the temperature of the coil arrangement directly influences the resistance and the inductance of the coil arrangement.

According to another aspect of the disclosure, the invention relates to a magnetic-inductive flowmeter, in which the described and derived object is achieved. The magnetic-inductive flowmeter according to the invention is initially and essentially characterized in that the control unit sets the constant magnetic field strength of the magnetic field within the commutation interval.

Setting is carried out in that the control unit arranges a first interval having a starting point in time and an ending point in time and a second interval having a starting point in time and an ending point in time within the commutation interval. Then, the control unit defines a first setpoint current curve for the first interval, where the first setpoint current curve differs by a difference current curve from the constant setpoint current such that the difference current curve, with reference to the constant setpoint current, effectuates a higher rate of change of the magnetic field strength towards the constant magnetic field strength. Then, the control unit defines a second setpoint current curve for the second interval, in that the constant setpoint current is assigned to the second setpoint current curve. Furthermore, the control unit is fed the first setpoint current curve in the first interval and the second setpoint current curve in the second interval.

It is provided in an aspect of the magnetic-inductive flowmeter according to the invention that the electromagnet has a commutation unit, and the commutation unit commutates the coil current. The commutation unit is, for example, an H bridge circuit, in which four switches are arranged and controlled by the electromagnet such that the direction of the coil current through the coil arrangement is reversed at the commutation interval. In an alternative apect, the current controller itself commutates the coil current, which makes a separate commutation unit superfluous.

In a further aspect of the magnetic-inductive flowmeter according to the invention, it is provided that the control unit is designed for carrying out one of the above-described methods according to the invention.

The explanations in respect to the method also hold true for the magnetic-inductive flowmeter and vice versa.

In detail, there is a plurality of possibilities for designing and further developing the method and the magnetic-inductive flowmeter according to the invention as will be apparent from the following description of preferred embodiments in conjunction with the accompanying drawings.

DETAILED DESCRIPTION OF THE INVENTION

Figure 1:
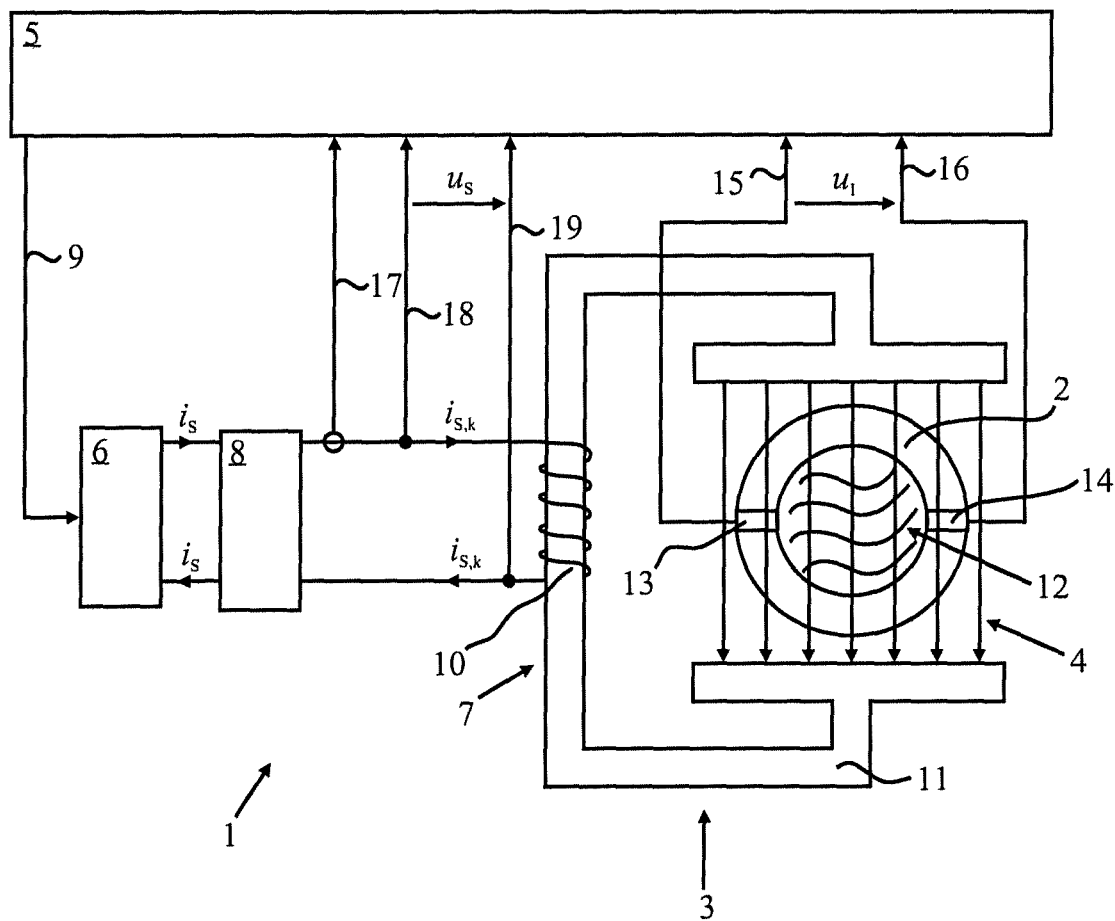
FIG. 1 shows an embodiment of a magnetic-inductive flowmeter in accordance with aspects of the present disclosure.

FIG. 1 shows the magnetic-inductive flowmeter 1 in operation. The magnetic-inductive flowmeter 1 has the measuring tube 2, the electromagnet 3 for generating the magnetic field 4 and the control unit 5. The measuring tube 2 is shown as a cross section. The electromagnet 3 has, in turn, the current controller 6, the coil arrangement 7 and the commutation unit 8.

Figures 2A, 2B, 2C, 2D:
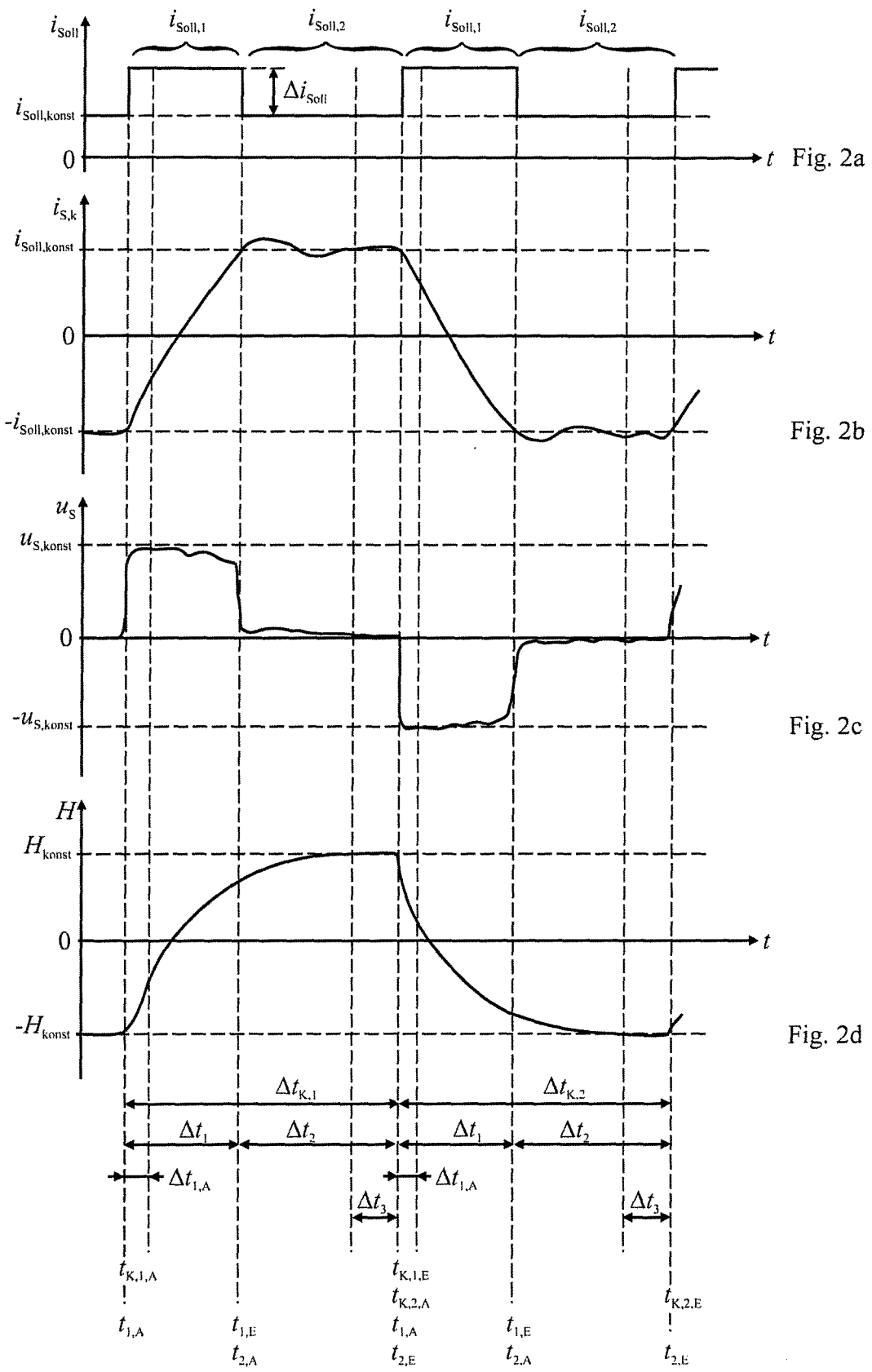
FIG. 2a shows a schematic representation of a setpoint current curve over time in accordance with aspects of the present disclosure.
FIG. 2b shows a schematic representation of a measured commutated coil current over time in accordance with aspects of the present disclosure.
FIG. 2c shows a schematic representation of a measured coil voltage over time in accordance with aspects of the present disclosure.
FIG. 2d shows a schematic representation of a magnetic field strength of a magnetic field over time in accordance with aspects of the present disclosure.

In this embodiment, the current controller 6 is an analog current controller and has a single controlled current source, which generates the coil current $i_s$ and a control loop. The function of the control loop is described using a setpoint variable, a process variable and a control variable. The control variable controls the controlled current source, with the process variable being the coil current $i_s$ generated from the controlled current source based on the control variable. Additionally, the setpoint variable is the setpoint current fed to the current controller 6, as shown in FIG. 2a. The setpoint current is fed to the current controller 6 by the control unit 5. The control unit 5 generates the signal describing the setpoint current with a microcontroller and a digital-analog converter, and then transmits the signal to the current controller 6 via the first signal path 9.

The current controller 6 evaluates a difference between the setpoint current and the generated coil current $i_s$ as a control deviation. Further, the current controller 6 minimizes the control deviation, whereby the process variable follows the setpoint variable. The tracking of the setpoint variable can thereby be carried out at most with a maximum rate of change of the process variable intrinsic for the current controller 6. A maximum rate of change of the process variable intrinsic for the current controller 6 is based on its control mode. In order to minimize the control deviation in this embodiment, the control loop exhibits proportional as well as integral and derivative control modes. Thus, the current controller 6 is a proportional-integral-derivative (PID) current controller. When the setpoint variable is greater than a setpoint variable that is needed for achieving the slew rate of the process variable, the controller is considered overdriven.

The commutation unit 8 in this embodiment has an H bridge circuit, in which four switches are arranged and controlled such that the coil current $i_s$ is commutated at the commutation interval $\Delta t_K$ so that the commutated coil current $i_{S,k}$ results, as shown in FIG. 2b. The commutated coil current $i_{S,k}$ differs from the coil current $i_s$ only in that the commutated coil current $i_{S,k}$ reverses its direction at the commutation interval $\Delta t_K$. Additionally, the commutated coil current $i_{S,k}$ effectuates the coil voltage $u_s$, as shown in FIG. 2c, and the magnetic field strength, as shown in FIG. 2d. The coil voltage $u_s$ is represented without a voltage portion caused by an ohmic resistance of the coil 10. In an alternative embodiment, the sole current source directly generates the commutated coil current $i_{S,k}$.

The coil arrangement 7 has the coil 10 and the yoke 11. The coil 10 is wound around the yoke 11 in one section of the yoke 11. The yoke 11 consists of a material having a low magnetic resistance, so that the magnetic field 4 generated by the commutated coil current $i_{S,k}$ in the coil 10 preferably propagates in the yoke 11. The yoke 11 is designed such that it forms a magnetic loop with an air gap, with a measuring tube 2 arranged in the air gap. Only the magnetic field 4 in the air gap is schematically represented in FIG. 1. The magnetic field 4 at least partially interfuses the measuring tube 2 and the medium 12 flowing through the measuring tube 2. Thereby, the direction of the magnetic field 4 is perpendicular to a direction of flow of the medium 12, whereby a potential gradient is induced in the medium 12. The direction of the potential gradient is aligned both perpendicular to the direction of the magnetic field 4 as well as perpendicular to the direction of flow of the medium 12.

The wall of the measuring tube 2 consists of a material that is transparent for magnetic fields, i.e., does not influence the magnetic field 4. Two recesses are located across from one another in the wall of the measuring tube 2, with a first measuring electrode 13 arranged in one recess and a second measuring electrode 14 arranged in the other recess. The first measuring electrode 13 and the second measuring electrode 14 are galvanically in contact with the medium 12. The induction voltage $u_I$ caused by the potential gradient in the medium 12 is tapped between the first measuring electrode 13 and the second measuring electrode 14. The control unit 5 measures the induction voltage $u_I$ over the second signal path 15 and third signal path 16.

In addition to the induction voltage $u_I$, the control unit 5 also measures the commutated coil current $i_{S,k}$ over the fourth signal path 17. Further, the control unit 5 also measures the coil voltage $u_s$ over the fifth signal path 18 and the sixth signal path 19.

When the control unit presets a constant setpoint current $i_{Soll,konst}$ of the current controller 6 via the first signal path 9, the electromagnet 3 generates the constant magnetic field strength $H_{konst}$ in a steady state. The settling of the magnetic field 4 means that at a point in time starting with the constant setpoint current $i_{Soll,konst}$ flowing through the coil 10, the constant magnetic field strength $H_{konst}$ is not yet present in the medium 12. The settling of the magnetic field 4 is essentially caused by material characteristics of the yoke 11. It has been recognized that these material characteristics are similar to the material characteristics that can cause hysteresis in ferromagnetic materials.

In this embodiment, the control unit 5 sets the constant magnetic field strength $H_{konst}$ within the first commutation interval $\Delta t_{K,1}$ with a starting point in time $t_{K,1,A}$ and the ending point in time $t_{K,1,E}$. The constant magnetic field strength—$H_{konst}$ is within the second commutation interval $\Delta t_{K,2}$ with the starting point in time $t_{K,2,A}$ and the ending point in time $t_{K,2,E}$ by carrying out the method as described in the following paragraphs and in conjunction with FIGS. 2a to 2d.

In FIGS. 2a to 2d, the first commutation interval $\Delta t_{K,1}$ and the second commutation interval $\Delta t_{K,2}$ are completely shown, where the ending point in time $t_{K,1,E}$ of the first commutation interval $\Delta t_{K,1}$ coincides with the starting point in time $t_{K,2,A}$ of the second commutation interval $\Delta t_{K,2}$. The commutation intervals differ from one another in that the coil current $i_s$ flows in one direction through the coil 10 during the first commutation interval $\Delta t_{K,1}$ while the coil current $i_s$ flows in the opposite direction through the coil 10 during the second commutation interval $\Delta t_{K,2}$. The commutation of the coil current $i_s$ is carried out by the commutation unit 8. In the following explanation, reference is only made to the first commutation interval $\Delta t_{K,1}$. The explanations for the first commutation interval $\Delta t_{K,1}$ are also valid for the second commutation interval $\Delta t_{K,2}$ and are also valid for the commutation intervals preceding the first commutation interval $\Delta t_{K,1}$ and the commutation intervals following the second commutation interval $\Delta t_{K,2}$.

In a first step of a method, the control unit 5 arranges the first interval $\Delta t_1$ with the starting point in time $t_{1,A}$ and the ending point in time $t_{1,E}$. Further, the control unit 5 arranges the second interval $\Delta t_2$ with the starting point in time $t_{2,A}$ and the ending point in time $t_{2,E}$ within the first commutation interval $\Delta t_{K,1}$. In this embodiment, the starting point in time $t_{1,A}$ of the first interval $\Delta t_1$ coincides with the starting point in time $t_{K,1,A}$ of the first commutation interval $\Delta t_{K,1}$. Additionally, the ending point in time $t_{1,E}$ of the first interval $\Delta t_1$ coincides with the starting point in time $t_{2,A}$ of the second interval $\Delta t_2$ and the ending point in time $t_{2,E}$ of the second interval $\Delta t_2$ coincides with ending point in time $t_{K,1,E}$ of the first commutation interval $\Delta t_{K,1}$.

In the second step of the method, the control unit 5 defines a first setpoint current curve $i_{Soll,1}$ for the first interval $\Delta t_1$, where the first setpoint current curve $i_{Soll,1}$ differs by a difference current curve $\Delta i_{Soll}$ from the constant setpoint current $i_{Soll,konst}$. The difference is such that the difference current curve $\Delta i_{Soll}$, with reference to the constant setpoint current $i_{Soll,konst}$, effectuates a higher rate of change of the magnetic field strength up to the constant magnetic field strength $H_{konst}$. The first setpoint current curve $i_{Soll,1}$ in this embodiment is constant in the entire first interval $\Delta t_1$. The magnitude of the first setpoint current curve $i_{Soll,1}$ is greater than the magnitude of the constant setpoint current $i_{Soll,konst}$ by the magnitude of the difference current curve $\Delta i_{Soll}$. Due to the greater magnitude of the first setpoint current curve $i_{Soll,1}$, with reference to the magnitude of the constant setpoint current $i_{Soll,konst}$, a higher rate of change of the magnetic field strength H up to the constant magnetic field strength $H_{konst}$ is effectuated. The duration of time from the starting point in time $t_{1,K,A}$ of the first commutation interval $\Delta t_{K,1}$ up to the constant magnetic field strength $H_{konst}$ is called a settling time. Due to the higher rate of change of the magnetic field strength H, the settling time is shortened. Furthermore, the first setpoint current curve $i_{Soll,1}$ at the beginning $\Delta t_{1,A}$ of the first interval $\Delta t_1$ causes the current controller 6 to overdrive, whereby the settling time is further decreased.

In the present embodiment, the control unit 5 defines the ending point in time $t_{1,E}$ of the first interval $\Delta t_1$. This is accomplished in that the control unit 5 measures the commutated coil current $i_{S,k}$ over a fourth signal path 17, then determines the point in time in which the measured commutated coil current $i_{S,k}$ reaches the constant setpoint current $i_{Soll,konst}$, and then adopts this point in time as ending point in time $t_{1,E}$ of the first interval $\Delta t_1$. In that, on the one hand, the starting point in time $t_{1,A}$ of the first interval $\Delta t_1$ coincides with the starting point in time $t_{K,1,A}$ of the first commutation interval $\Delta t_{K,1}$ and the ending point in time $t_{2,E}$ of the second interval $\Delta t_2$ coincides with ending point in time $t_{K,1,E}$ of the first commutation interval $\Delta t_{K,1}$. On the other hand, the ending point in time $t_{1,E}$ of the first interval $\Delta t_1$ coincides with the starting point in time $t_{2,A}$ of the second interval $\Delta t_2$, in which the commutated coil current $i_{S,k}$ has reached the constant setpoint current $i_{Soll,konst}$, both the first interval $\Delta t_1$ and the second interval $\Delta t_2$ are completely defined.

In a third step of the method, the control unit 5 defines a second setpoint current curve $i_{Soll,2}$ for the second interval $\Delta t_2$, in that the constant setpoint current $i_{Soll,konst}$ is assigned to the second setpoint current curve $i_{Soll,2}$.

In a fourth step of the method, the current controller 6 feeds the control unit 5 with the first setpoint current curve $i_{Soll,1}$ in the first interval $\Delta t_1$ and the second setpoint current curve $i_{Soll,2}$ in the second interval $\Delta t_2$.

Additionally, in this embodiment, the control unit 5 carries out a method for adaptive adjustment of the magnitude of the first setpoint current curve $i_{Soll,1}$. The method is comprised of determining an evaluation quantity in at least the first commutation interval $\Delta t_{K,1}$ and the second commutation interval $\Delta t_{K,2}$. The determination of the evaluation quantity is the same for all commutation intervals, and therefore is only described for the first commutation interval in the following paragraphs.

First, the control unit 5 measures the coil voltage $u_S$, illustrated in FIG. 2c. The coil voltage $u_S$ is caused in the coil 10 by the commutated coil current $i_{S,k}$, which is illustrated in FIG. 2b, over the fifth signal path 18 and the sixth signal path 19 in the third interval $\Delta t_3$. The third interval $\Delta t_3$ is arranged within the second interval $\Delta t_2$ as an indicator quantity. The adoption of the coil voltage $u_S$ is based on the finding that, when the commutated coil current $i_{S,k}$ as well as the magnetic field strength H, illustrated in FIG. 2d, are constant, then the coil voltage $u_S$ is also constant. However, when the commutated coil current $i_{S,k}$ is constant, but the magnetic field strength H is not constant, the coil voltage $u_S$ is also not constant. In this situation, the temporal course of the coil voltage $u_S$ contains information about the temporal course of the magnetic field strength H. The control unit 5 then forms the evaluation quantity from the indicator quantity in that, in this embodiment, one thousand measured values of the indicator quantity are measured. The arithmetic mean value over the thousand measured values is formed and the mean value is then subtracted from the first measured value.

The control unit 5 then determines at least one trend quantity from the evaluation quantity of at least the first commutation interval $\Delta t_{K,1}$ and the second commutation interval $\Delta t_{K,2}$, in that a change of the evaluation quantity is determined over the commutation intervals. Using the trend quantity, the magnitude of the first setpoint current curve $i_{Soll,1}$ is adaptively adjusted.

What is claimed is:

1. A method for setting a constant magnetic field strength of a magnetic field within a commutation interval, the method comprising:
   using a magnetic-inductive flowmeter having a measuring tube and an electromagnet to generate a magnetic field, wherein
      the electromagnet has a current controller and a coil arrangement, the current controller generating a coil current and the generated coil current effectuating the magnetic field in the coil arrangement,
      the coil current is commutated at the commutation interval,
   wherein
      when a constant setpoint current of the current controller is preset, the electromagnet generates the constant magnetic field strength in steady state,
   a first interval has a first starting point in time and a first ending point in time and a second interval has a second starting point in time and a second ending point in time, the first and second starting points and the first and second ending points are arranged within the commutation interval, and
   a first setpoint current curve is defined for the first interval,
   wherein
      the first setpoint current curve differs by a difference current curve from the constant setpoint current such that the difference current curve, with reference to the constant setpoint current, effectuates a higher rate of change of a magnetic field strength towards the constant magnetic field strength,
      a second setpoint current curve is defined for the second interval, in that the constant setpoint current is assigned to the second setpoint current curve, and
      the current controller is fed the first setpoint current curve in the first interval and the second setpoint current curve in the second interval.

2. The method according to claim 1, wherein the current controller is overdriven by the first setpoint current curve at a beginning of the first interval.

3. The method according to claim 1, wherein the first interval is shorter than a settling time constant of the magnetic field.

4. The method according to claim 1, wherein the first setpoint current curve is constant.

5. The method according to claim 1, wherein
the coil current is measured such that a point in time is determined in which the measured coil current has reached the first setpoint current curve or the second setpoint current curve, and
the determined point in time is adopted as the first ending point in time of the first interval and as the second starting point in time of the second interval.

6. The method according to claim 1, wherein the first setpoint current curve is set so a magnitude of the difference current curve does not exceed 15% of a magnitude of the constant setpoint current.

7. The method according to claim 1, wherein the magnetic field strength, an induction voltage induced in a medium by the magnetic field by a flow of the medium in the measuring tube, the coil current, a coil voltage generated from the coil current in the coil arrangement measured as an indicator quantity, the first interval, and the first setpoint current curve are defined using the indicator quantity.

8. The method according to claim 7, wherein the indicator quantity is measured in a third interval within the second interval.

9. The method according to claim 7, wherein
a first measured value and a second measured value of the indicator quantity are measured to form an evaluation quantity,
a mean value is formed and subtracted from the first measured value, and
the first interval and/or the first setpoint current curve is/are defined using the evaluation quantity.

10. The method according to claim 9, wherein
a trend quantity is determined from the evaluation quantity,
a change of the evaluation quantity is determined from the second interval of the commutation interval and a second interval of at least one additional commutation interval, and
the first interval and/or the first setpoint current curve is/are defined using the trend quantity.

11. The method according to claim 1, wherein a temperature at the magnetic-inductive flowmeter is measured and that the measured temperature is used in determining the first interval and/or the first setpoint current curve.

12. The method according to claim 11, wherein a temperature of the coil arrangement and/or of the medium is also measured.

13. A magnetic-inductive flowmeter, comprising:
a measuring tube;
an electromagnet for generating a magnetic field; and
a control unit,
wherein
the electromagnet comprises a current controller and a coil arrangement, the current controller generating a coil current and the generated coil current effectuates the magnetic field in the coil arrangement,
the electromagnet commutates the coil current at a commutation interval,
wherein,
when a constant setpoint current of the current controller is preset and the electromagnet generates a constant magnetic field strength in a steady state,
the control unit sets the constant magnetic field strength of the magnetic field within the commutation interval,
the control unit arranges a first interval having a first starting point in time and a first ending point in time and a second interval having a second starting point in time and a second ending point in time within the commutation interval, and
the control unit defines a first setpoint current curve for the first interval, wherein
the first setpoint current curve differs by a difference current curve from the constant setpoint current such that the difference current curve with reference to the constant setpoint current effectuates a higher rate of change of the magnetic field strength towards the constant magnetic field strength,
the control unit defines a second setpoint current curve for the second interval in that the constant setpoint current is assigned to the second setpoint current curve, and
the control unit is fed the first setpoint current curve in the first interval and the second setpoint current curve in the second interval.

14. The magnetic-inductive flowmeter according to claim 13, wherein the electromagnet comprises a commutation unit which commutates the coil current.

15. A magnetic-inductive flowmeter comprising a control unit configured to perform the method according to claim 1.

* * * * *